(12) United States Patent
Jung et al.

(10) Patent No.: US 8,727,066 B2
(45) Date of Patent: May 20, 2014

(54) STEERING APPARATUS OF VEHICLE AND SYSTEM OF CONTROLLING THE SAME

(75) Inventors: Daesuk Jung, Hadong-gun (KR); Un Koo Lee, Seoul (KR); Soobo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 163 days.

(21) Appl. No.: 13/528,595

(22) Filed: Jun. 20, 2012

(65) Prior Publication Data
US 2013/0126258 A1 May 23, 2013

(30) Foreign Application Priority Data

Nov. 21, 2011 (KR) .................. 10-2011-0121511

(51) Int. Cl.
  *B62D 5/04* (2006.01)
  *B62D 6/08* (2006.01)
  *F16D 27/02* (2006.01)
  *B62D 1/181* (2006.01)

(52) U.S. Cl.
  CPC .............. *B62D 1/181* (2013.01); *B62D 5/0409* (2013.01); *B62D 5/0433* (2013.01); *B62D 5/0478* (2013.01)
  USPC .......................................... 180/444; 280/775

(58) Field of Classification Search
  CPC .. B62D 5/0409; B62D 5/0433; B62D 5/0478; B62D 1/18; B62D 1/181
  USPC ................................... 180/443, 444; 280/775
  See application file for complete search history.

(56) References Cited

U.S. PATENT DOCUMENTS

2013/0275010 A1* 10/2013 Kouchi .......................... 701/49

FOREIGN PATENT DOCUMENTS

| JP | 2001-199350 A | 7/2001 |
| JP | 2005-319999 A | 11/2005 |
| JP | 2007-015576 A | 1/2007 |
| JP | 2007-302231 A | 11/2007 |
| JP | 2007-326569 A | 12/2007 |
| KR | 2020090100496 A | 9/2009 |

* cited by examiner

*Primary Examiner* — Kevin Hurley
(74) *Attorney, Agent, or Firm* — Morgan, Lewis & Bockius LLP

(57) ABSTRACT

A steering apparatus of a vehicle including a motor, a motor shaft, a power delivery section selectively engaged to the motor shaft, a variable steering section connected to the steering column and selectively engaged to the motor shaft to control an angle and a length of the steering column, a connecting section selectively engaged to the motor shaft and delivering the torque of the motor to the variable steering section, and a first converting section delivering the torque of the motor to one of the power delivery section and the connecting section, wherein the first converting section includes a motor clutch coupling a power delivery shaft of the power delivery section to or decoupling the power delivery shaft from the motor shaft, and a delivery member engaged to the motor shaft when the motor shaft is decoupled from the power delivery shaft by the motor clutch.

13 Claims, 15 Drawing Sheets

STEERING APPARATUS OF VEHICLE AND SYSTEM OF CONTROLLING THE SAME

CROSS-REFERENCE TO RELATED APPLICATION

The present application claims priority to Korean Patent Application No. 10-2011-0121511 filed in the Korean Intellectual Property Office on Nov. 21, 2011, the entire contents of which is incorporated herein for all purposes by this reference.

BACKGROUND OF THE INVENTION

1. Field of the Invention

The present invention relates to a steering apparatus of a vehicle and a system of controlling the same, and more particularly to a steering apparatus of a vehicle and a system of controlling the same which can assist maneuvering force of a steering column and control length and angle of the steering column.

2. Description of Related Art

Generally, a power steering apparatus of a vehicle assists maneuvering force of a steering column by using additional hydraulic pressure or torque of a motor for light and quick steering maneuver.

The power steering apparatus using hydraulic pressure is mainly applied, but the power steering apparatus using the torque of the motor is increasingly used, recently.

A motor driven power steering system (MDPS) is provided with an electric control unit (ECU) that controls the motor such that light and comfortable steering force is created at a low-speed region and heavy steering force is created so as to improve safety at a high-speed region according to a driving condition of a vehicle detected by a vehicle speed sensor and a steering torque sensor.

In addition, a tilting device and a telescopic device for controlling angle and length of a steering column are mounted at the steering column of the motor driven power steering system.

A driver can control vertical position of a steering handle according to his body type by means of the tilting device and horizontal position of the steering handle to length direction of the steering column by means of the telescopic device. The tilting device and the telescopic device like the motor driven power steering system are operated by a motor, and a motor other than the motor operating the motor driven power steering system is provided.

Generally, the motor driven power steering system is used during driving the vehicle, but the tilting device and the telescopic device are not used during the driving the vehicle. Therefore, private motors for respective devices are not necessary. Nevertheless, in a case that private motors are used for respective devices, structure of a vehicle body may be complex, weight of the vehicle body may increase, and production cost of the vehicle may be raised.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a steering apparatus of a vehicle and a system of controlling the same having advantages of assisting maneuvering force of a steering column or controlling angle and length of the steering column by using only one motor.

Various aspects of the present invention are directed to providing a steering apparatus of a vehicle and a system of controlling the same having further advantages of effectively delivering torque of a motor for assisting maneuvering force of a steering column to a variable steering device for controlling angle and length of the steering column.

In an aspect of the present invention, a steering apparatus of a vehicle, may include a motor, a motor shaft connected to the motor and delivering a torque of the motor, a power delivery section selectively engaged to the motor shaft and delivering the torque of the motor received from the motor shaft to a steering column, a variable steering section connected to the steering column and selectively engaged to the motor shaft to control an angle and a length of the steering column, a connecting section selectively engaged to the motor shaft and delivering the torque of the motor to the variable steering section, and a first converting section delivering the torque of the motor to one of the power delivery section and the connecting section selectively, wherein the first converting section may include a motor clutch coupling a power delivery shaft of the power delivery section to or decoupling the power delivery shaft from the motor shaft, and a delivery member engaged to the motor shaft and delivering the torque of the motor to the connecting section when the motor shaft is decoupled from the power delivery shaft by the motor clutch.

The motor clutch is an electromagnet clutch.

The motor clutch may include a first clutch plate connected to the motor shaft, a second clutch plate connected to the power delivery shaft, an electromagnet disposed adjacent to the first clutch plate and being selectively magnetized by current, and an elastic member elastically biasing the first clutch plate or the second clutch plate, wherein the first clutch plate is coupled to or decoupled from the second clutch plate according to whether current is supplied to the electromagnet.

The delivery member is disposed between the first clutch plate and the electromagnet and disposed apart from the motor shaft, wherein the first clutch plate is coupled to or decoupled from the delivery member according to whether current is supplied to the electromagnet.

Teeth are formed respectively at contacting surfaces of the first clutch plate and the second clutch plate.

Teeth are formed respectively at contacting surfaces of the first clutch plate and the delivery member.

The connecting section may include a first connecting member engaged with the delivery member, a second connecting member engaged with the variable steering section, and a connecting shaft connecting the first connecting member with the second connecting member.

The motor shaft and the connecting shaft are disposed apart from and in parallel with each other, wherein the first connecting member and the delivery member are spur gears, respectively.

The power delivery shaft is positioned perpendicularly to the steering column, wherein a worm is formed at one of the power delivery shaft and the steering column, and a worm wheel is formed at the other of the power delivery shaft and the steering column.

In another aspect of the present invention, a system of controlling a steering apparatus of a vehicle, may include a motor, a motor shaft connected to the motor to deliver torque of the motor, a power delivery section selectively coupled to the motor shaft to deliver the torque of the motor received from the motor shaft to a steering column for assisting maneuvering force of a steering handle, a connecting section selectively coupled to the motor shaft to deliver the torque of the motor to a variable steering section so as to control an angle and a length of the steering column, a motor clutch coupling a power delivery shaft of the power delivery section to or disconnecting the power delivery shaft from the motor shaft, a delivery member engaged with the motor shaft and delivering the torque of the motor to the connecting section when the motor shaft is decoupled from the power delivery shaft by the motor clutch, and a control portion controlling operations of the motor and the motor clutch.

The control portion transmits a control signal to the motor so as to drive the motor when maneuver of the steering handle is detected, transmitting a control signal to the motor clutch for coupling the motor shaft with the power delivery shaft when assistance to the maneuvering force of the steering handle is requested, and transmitting a control signal to the motor clutch for decoupling the motor shaft from the power delivery shaft when control of the angle or the length of the steering handle is requested.

The motor clutch is a clutch using an electromagnet, wherein the control portion controls supply of current to the electromagnet so as to control the operation of the motor clutch.

The motor clutch may include a first clutch plate connected to the motor shaft, a second clutch plate connected to the power delivery shaft, the electromagnet disposed adjacent to the first clutch plate and being selectively magnetized by current, and an elastic member elastically biasing the first clutch plate or the second clutch plate, wherein when current is not supplied to the electromagnet by the control signal of the control portion, the first clutch plate and the second clutch plate are coupled by an elastic force of the elastic member, and when current is supplied to the electromagnet by the control signal of the control portion, the first clutch plate is decoupled from the second clutch plate and is coupled to the delivery member by magnetic force of the electromagnet.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
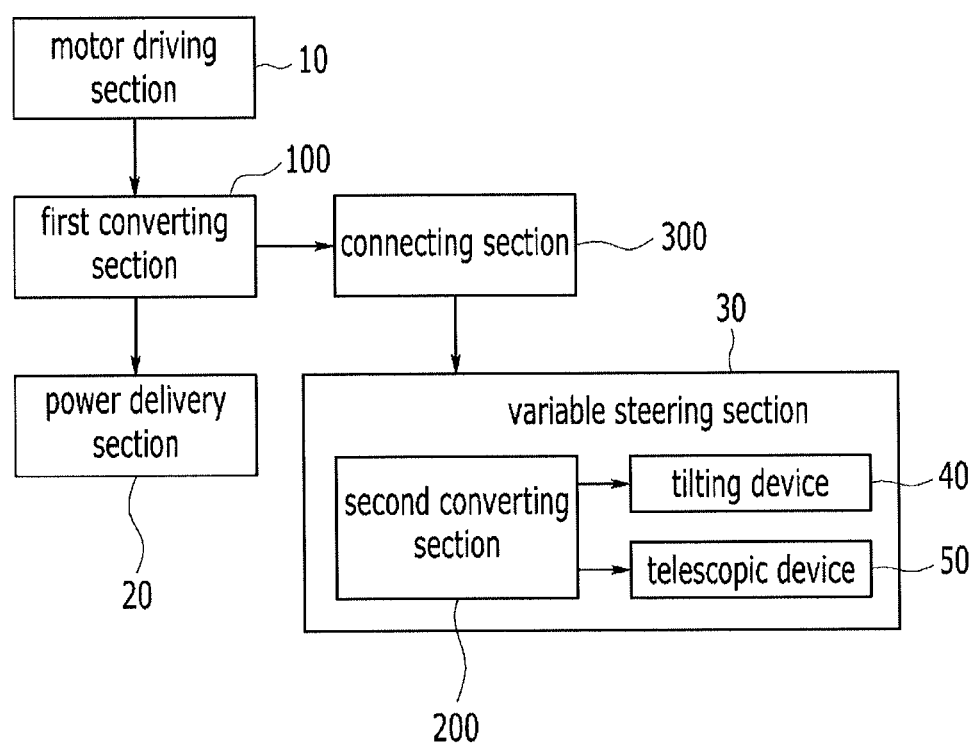
FIG. 1 is a block diagram of a steering apparatus of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings so as to be easily practiced by a person skilled in the art.

Such exemplary embodiments are exemplary embodiments according to an exemplary embodiment of the present invention. Since a person skilled in the art can realize the present invention in various forms of exemplary embodiments, the scope of the present invention is not limited to exemplary embodiments which will be hereinafter described.

Figure 2:
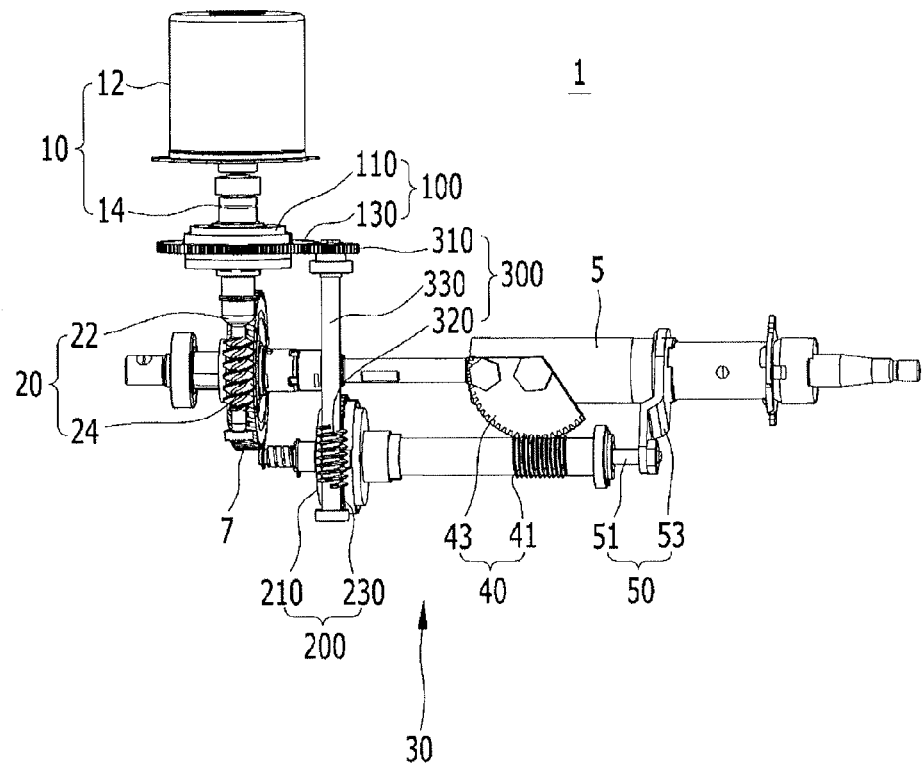
FIG. 2 is a schematic diagram of a steering apparatus of a vehicle according to an exemplary embodiment of the present invention.

FIG. 1 is a block diagram of a steering apparatus of a vehicle according to an exemplary embodiment of the present invention, and FIG. 2 is a schematic diagram of a steering apparatus of a vehicle according to an exemplary embodiment of the present invention.

As shown in FIG. 1 and FIG. 2, a steering apparatus 1 of a vehicle is adapted to assist maneuvering force of a steering handle 4 (referring to FIG. 9) and control angle and length of a steering column 5 coupled to the steering handle 4 by using one motor 12.

In further detail, the steering apparatus 1 of the vehicle according to an exemplary embodiment of the present invention is adapted to use the motor 12 for assisting the maneuvering force of the steering handle 4 so as to control the angle and the length of the steering column 5.

The steering apparatus 1 of the vehicle includes a motor driving section 10 provided with the motor 12 and a motor shaft 14, a power delivery section 20 adapted to deliver the torque of the motor 12 for assisting the maneuvering force of the steering handle 4 to the steering column 5, and a variable steering section 30 adapted to receive the torque of the motor 12 and control the angle and the length of the steering column 5.

In addition, the steering apparatus 1 of the vehicle includes a connecting section 300 adapted to deliver the torque of the motor 12 to the variable steering section 30, a first converting section 100 adapted to selectively deliver the torque of the motor 12 to one of the power delivery section 20 or the connecting section 300, and a second converting section 200 adapted to selectively deliver the torque of the motor 12 to one of a tilting device 40 and a telescopic device 50 of the variable steering section 30.

The motor driving section 10 includes the motor 12 adapted to generate the torque for operating the steering apparatus 1 of the vehicle and the motor shaft 14 coupled to the motor 12 and delivering the torque of the motor 12. The motor shaft 14 is connected to the first converting section 100 and delivers the torque of the motor 12 to the power delivery section 20 and the connecting section 300 through the first converting section 100.

The power delivery section 20 is disposed between the motor driving section 10 and the steering column 5, and includes a power delivery shaft 22 and a gear 24.

The power delivery shaft 22 delivers the torque of the motor 12 received from the motor shaft 14 to the steering column 5 through the gear 24. The gear 24 coupled to the power delivery shaft 22 engages with a gear 7 coupled to the steering column 5 so as to supply the torque of the motor 12 to the steering column 5. The gears 24 and 7 coupled to the power delivery shaft 22 and the steering column 5 may be provided in various types.

In a case that the power delivery shaft 20 and the steering column 5, for example, are disposed perpendicularly, the gears 24 and 7 coupled to the power delivery shaft 20 and the steering column 5 may be a worm gear. The gear 24 coupled to the power delivery shaft 20 may be a worm and the gear 7 coupled to the steering column 5 may be a worm wheel. In this case, the torque of the motor 12 is delivered to the steering column 5 in a state that rotation speed is reduced so as to lighten the maneuvering force of the steering handle 4.

That is, the torque of the motor 12 is delivered to the power delivery section 20 through the first converting section 100, and is then delivered to the steering column 5 through the worm gear connecting the power delivery section 20 to the steering column 5. Therefore, the maneuvering force of the steering handle 4 is assisted.

The first converting section 100 delivers the torque of the motor 12 to one of the power delivery section 20 and the connecting section 300 by using a motor clutch 110. The first converting section 100 is connected to the motor driving section 10, the power delivery section 20, and the connecting section 300, and includes the motor clutch 110 and a first delivery member 130.

The motor shaft 14 of the motor driving section 10 is connected to or disconnected from the power delivery shaft 22 of the power delivery section 20 through the motor clutch 110. Various types of clutches may be used as the motor clutch 110. The motor clutch 110 may be a clutch using an electromagnet or a mechanical clutch.

The torque of the motor 12 is delivered from the motor shaft 14 to the power delivery shaft 22 if the motor shaft 14 and the power delivery shaft 22 are connected, and is delivered from the motor shaft 14 to the connecting section 300 through the first delivery member 130 if the motor shaft 14 and the power delivery shaft 22 are disconnected.

The variable steering section 30 is coupled to the steering column 5 so as to control the angle and the length of the steering column 5. That is, the variable steering section 30 changes the angle and the length of the steering column 5 coupled to the steering handle 4 so as to change a position of the steering handle 4. The variable steering section 30 includes the tilting device 40 for controlling the angle of the steering column 5, the telescopic device 50 for controlling the length of the steering column 5, and the second converting section 200.

Various types of tilting devices 40 and telescopic devices 50 may be used.

The tilting device 40 changes the angle of the steering column 5 by being rotated by the torque of the motor 12. The tilting device 40 includes tilting rotational member 41 rotated by the torque of the motor 12 and a tilting connecting member 43 connecting the tilting rotational member 41 to the steering column 5.

The tilting connecting member 43 converts rotational movement of the tilting rotational member 41 into upward or downward linear movement of the steering column 5. If the torque of the motor 12 is delivered to the tilting rotational member 41 through the connecting section 300 and the second converting section 200, the tilting rotational member 41 and the tilting connecting member 43 deliver the torque of the motor 12 to the steering column 5. Therefore, the angle of the steering column 5 is controlled.

The telescopic device 50 changes the length of the steering column 5 by being rotated by the torque of the motor 12. The telescopic device 50 includes a telescopic rotational member 51 rotated by the torque of the motor 12 and a telescopic connecting member 53 connecting the telescopic rotational member 51 to the steering column 5.

The telescopic connecting member 53 converts rotational movement of the telescopic rotational member 51 into linear movement of the steering column 5 in a length direction thereof. That is, if the torque of the motor 12 is delivered to the telescopic rotational member 51 through the connecting section 200 and the second converting section 100, the telescopic rotational member 51 and the telescopic connecting member 53 deliver the torque of the motor 12 to the steering column 5. Therefore, the length of the steering column 5 is controlled.

The second converting section 200 delivers the torque of the motor 12 to one of the tilting device 50 and the telescopic device 60 by using a variable steering clutch 210. The second converting section 200 includes the variable steering clutch 210 and a second delivery member 230. The torque of the motor 12 delivered from the connecting section 300 is delivered to the variable steering clutch 210 through the second delivery member 230. The variable steering clutch 210 is selectively coupled to one of the tilting device 50 and the telescopic device 60, and delivers the torque of the motor 12 delivered through the second delivery member 230 to the tilting device 50 or the telescopic device 60.

The connecting section 300 connects the first converting section 100 with the variable steering section 30. In further detail, the connecting section 300 connects the first delivery member 130 of the first converting section 100 with the second delivery member 230 of the second converting section 200. The connecting section 300 includes a first connecting member 310 connected to the first delivery member 130 of the first converting section 100, a second connecting member 320 connected to the second delivery member 230 of the second converting section 200, and a connecting shaft 330 connecting the first connecting member 310 with the second connecting member 320.

The first connecting member 310 receives the torque of the motor 12 through the first delivery member 130 connected to the motor shaft 14, and the second connecting member 320 receives the torque of the motor 12 through the connecting shaft 330 connected to the first connecting member 310 so as to deliver the torque of the motor 12 to the second delivery member 230 of the second converting section 200.

The first connecting member 310 is engaged to the first delivery member 130. In addition, the motor shaft 14 and the connecting shaft 330 are disposed in parallel with each other, and the first connecting member 310 and the first delivery member 130 may be, not limited to, a spur gear. The first connecting member 310 and the first delivery member 130 may be other gear types according to positions of the motor shaft 14 and the connecting shaft 330, and the first connecting member 310 and the first delivery member 130 may be disposed apart from each other and connected through an additional member.

The second connecting member 320 is engaged with the second delivery member 230. In addition, an axis of the second connecting member 320 is disposed perpendicularly to an axis of the second delivery member 230, and thus the second connecting member 320 and the second delivery member 230 may be a worm gear. For example, the second connecting member 320 is a worm and the second delivery member 230 is a worm wheel. However, the second connecting member 320 and the second delivery member 230 are not limited to the worm gear. The second connecting member 320 and the second delivery member 230 may be other gear types according to positions of their axes. The second connecting member 320 and the second delivery member 230 may be disposed apart from each other and connected through an additional member.

As described above, the steering apparatus 1 of the vehicle delivers the torque of the motor 12 selectively to one of the power delivery section 20, the tilting device 40, and the telescopic device 50. In further detail, the steering apparatus 1 of the vehicle delivers the torque of the motor 12 by using the first converting section 100 and the second converting section 200.

The steering apparatus 1 of the vehicle according to an exemplary embodiment of the present invention will be described by describing the first converting section 100 and the second converting section 200 in further detail. The steering apparatus 1 of the vehicle related to operation of the first converting section 100 will be called a first system, and the steering apparatus 1 of the vehicle related to operation of the second converting section 200 will be called a second system.

Figure 3:
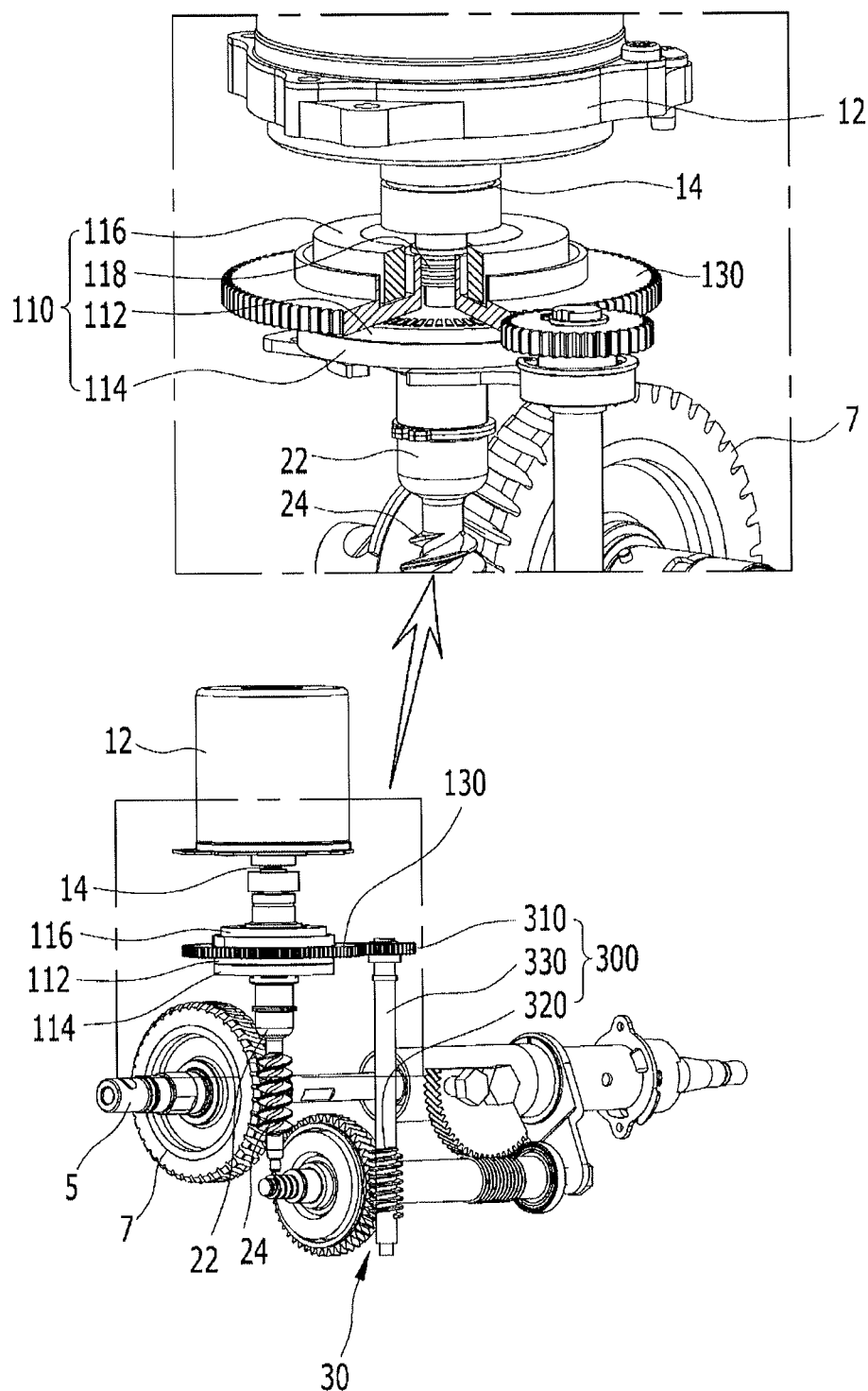
FIG. 3 is a schematic diagram of the first system and the first converting section in a steering apparatus of a vehicle according to an exemplary embodiment of the present invention.
Figure 4:
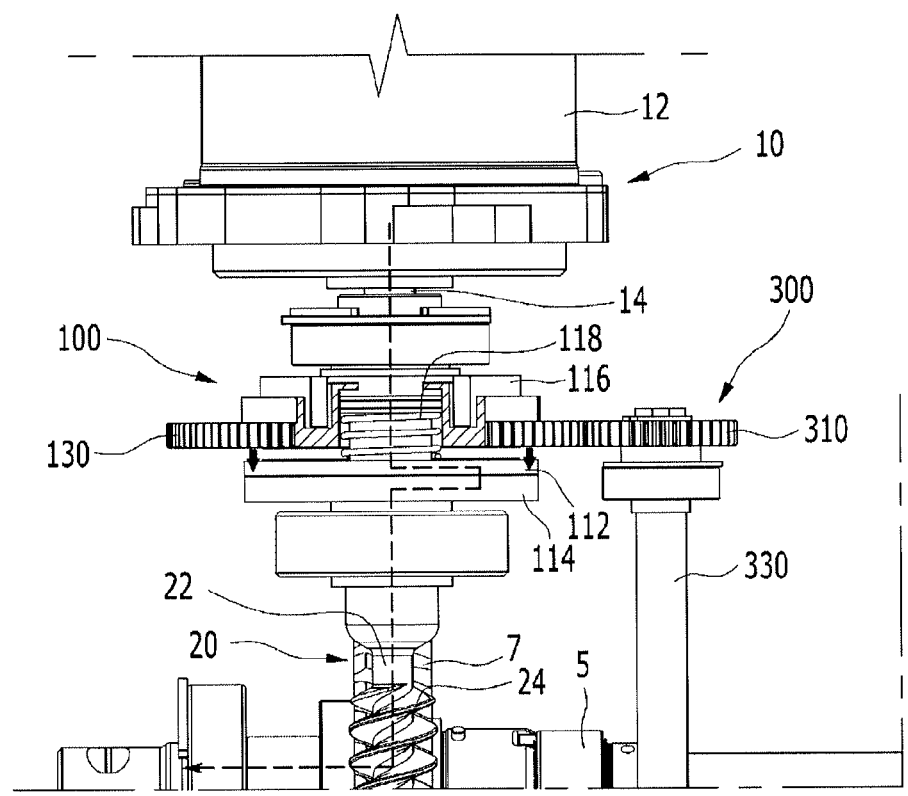
FIG. 4 to FIG. 5 are schematic diagrams for showing operation of the first converting section according to an exemplary embodiment of the present invention.
Figure 5:
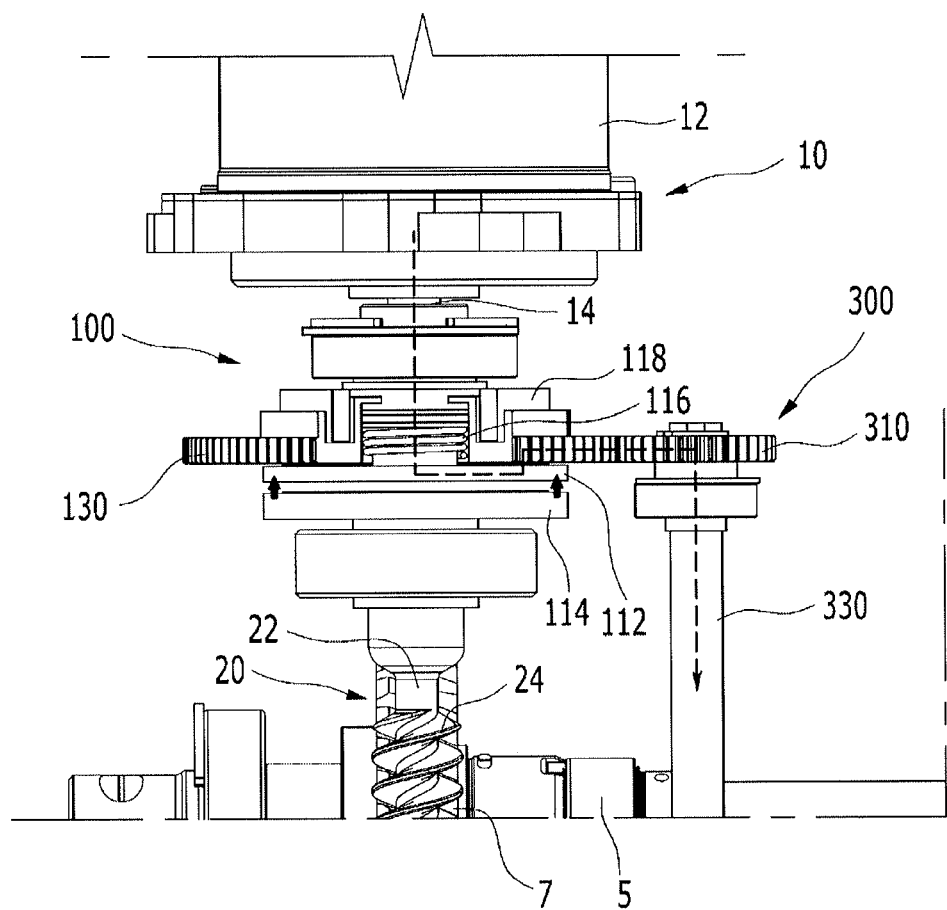

FIG. 3 is a schematic diagram of the first system and the first converting section in a steering apparatus of a vehicle according to an exemplary embodiment of the present invention, and FIG. 4 to FIG. 5 are schematic diagrams for showing operation of the first converting section according to an exemplary embodiment of the present invention. A dotted line in FIG. 4 to FIG. 5 indicates a delivery direction of the torque of the motor 12, and a bold arrow indicates an operating direction of a first clutch plate 112 of the motor clutch 110.

The first system of the steering apparatus 1 delivers the torque of the motor 12 to the power delivery section 20 or the variable steering section 30 by using the first converting section 100, and includes the motor driving section 10, the power delivery section 20, the first converting section 100, the connecting section 300, and the variable steering section 30.

Structures and operations of the motor driving section 10, the power delivery section 20, the connecting section 300, and the variable steering section 30 are the same as those described above, and thus detailed description thereof will be omitted.

As described above, the first converting section 100 delivers the torque of the motor 12 to one of the power delivery section 20 and the connecting section 30 by using the motor clutch 110. In further detail, the first converting section 100 is connected respectively to the motor driving section 10, the power delivery section 20, and the connecting section 300, and thereby the torque of the motor 12 is delivered from the motor driving section 10 to the power delivery section 20 or the connecting section 300 according to operation of the motor clutch 110.

The motor clutch 110 is disposed between the motor shaft 14 and the power delivery shaft 22 and connects or disconnects the motor shaft 14 and the power delivery shaft 22. The motor clutch 110 includes the first clutch plate 112, a second clutch plate 114, a first electromagnet 116, and a first elastic member 118.

The first clutch plate 112 is coupled to the motor shaft 14, and the second clutch plate 114 is coupled to the power delivery shaft 22 so as to correspond to the first clutch plate 112. Therefore, the motor clutch 110 couples the first clutch plate 112 to or decouples the first clutch plate 112 from the second clutch plate 114 so as to couple or decouple the motor shaft 14 and the power delivery shaft 22.

The first electromagnet 116 and the first elastic member 118 move the first clutch plate 112 or the second clutch plate 114 such that the motor shaft 14 is coupled to or decoupled from the power delivery shaft 22. That is, the first clutch plate 112 or the second clutch plate 114 is moved according to arrangement of the first electromagnet 116 and the first elastic member 118.

For example, the first electromagnet 116 and the first elastic member 118 are disposed close to the first clutch plate 112, as shown in FIG. 3 to FIG. 5. That is, the first electromagnet 116 and the first elastic member 118 move the first clutch plate 112 such that the motor shaft 14 is coupled to or decoupled from the power delivery shaft 22.

The first electromagnet 116 is disposed between the first clutch plate 112 and the motor 12. If the first electromagnet 116 is magnetized by current, the first clutch plate 112 is moved toward the first electromagnet 116 by magnetic force.

The first elastic member 118 is coupled to the first clutch plate 112 so as to move the first clutch plate 112 by elastic force. If current is not supplied to the first electromagnet 116, that is, the first electromagnet 116 is not magnetized, the first clutch plate 112 is moved toward the second clutch plate 114 by elastic force of the first elastic member 118.

That is, the first clutch plate 112 is moved by the first electromagnet 116 and the first elastic member 118 so as to be coupled to or decoupled from the second clutch plate 114.

The first delivery member 130 is disposed between the first clutch plate 112 and the first electromagnet 116, and is selectively connected to the motor shaft 14. That is, the first delivery member 130 is disposed apart from the motor shaft 14 and is selectively connected to the motor shaft 14 by operation of the motor clutch 110.

If the motor shaft 14 is disconnected from the power delivery shaft 22 by the motor clutch 110, the first delivery member 130 is connected to the motor shaft 14 so as to deliver the torque of the motor 12 to the connecting section 300. In further detail, if the first clutch plate 112 is pulled toward the first electromagnet 116 by magnetic force of the first electromagnet 116, the first delivery member 130 is coupled to and rotates with the first clutch plate 112 coupled to the motor shaft 14.

Teeth may be formed at respective contacting surfaces of the first clutch plate 112, the second clutch plate 114, and the first delivery member 130. In further detail, teeth that can be engaged with each other are formed respectively at contacting surfaces of the first clutch plate 112 and the second clutch plate 114, and teeth that can be engaged with each other are formed respectively at contacting surfaces of the first clutch plate 112 and the first delivery member 130. Thereby, coupling force and delivery of rotational force may be improved.

The first converting section 100 couples the motor shaft 14 to or decouples the motor shaft 14 from the power delivery shaft 22 by magnetic force of the first electromagnet 116, and thereby delivers the torque of the motor 12 to the power delivery section 10 or the connecting section 300.

Therefore, the first system of the steering apparatus 1 is adapted to deliver the torque of the motor 12 to the power delivery section 10 or the connecting section 300. Operation of the first system will be described in detail.

If current is not supplied to the first electromagnet 116, the first clutch plate 112 and the second clutch plate 114 are coupled by the elastic force of the first elastic member 118 and the torque of the motor 12 is delivered from the motor shaft 14 to the power delivery shaft 22. The torque of the motor 12 delivered to the power delivery shaft 22 is then delivered to the steering column 5 so as to assist the maneuvering force of the steering handle 4.

If the first electromagnet 116, on the contrary, is magnetized by current, the first clutch plate 112 is decoupled from the second clutch plate 114 and is coupled to the first delivery member 130. In this case, the torque of the motor 12 is delivered to the variable steering section 30 through the first delivery member 130 and the first connecting member 310 of the connecting section 300. Therefore, the torque of the motor 12 delivered to the variable steering section 30 is used for controlling the angle and the length of the steering column 5.

Figure 6:
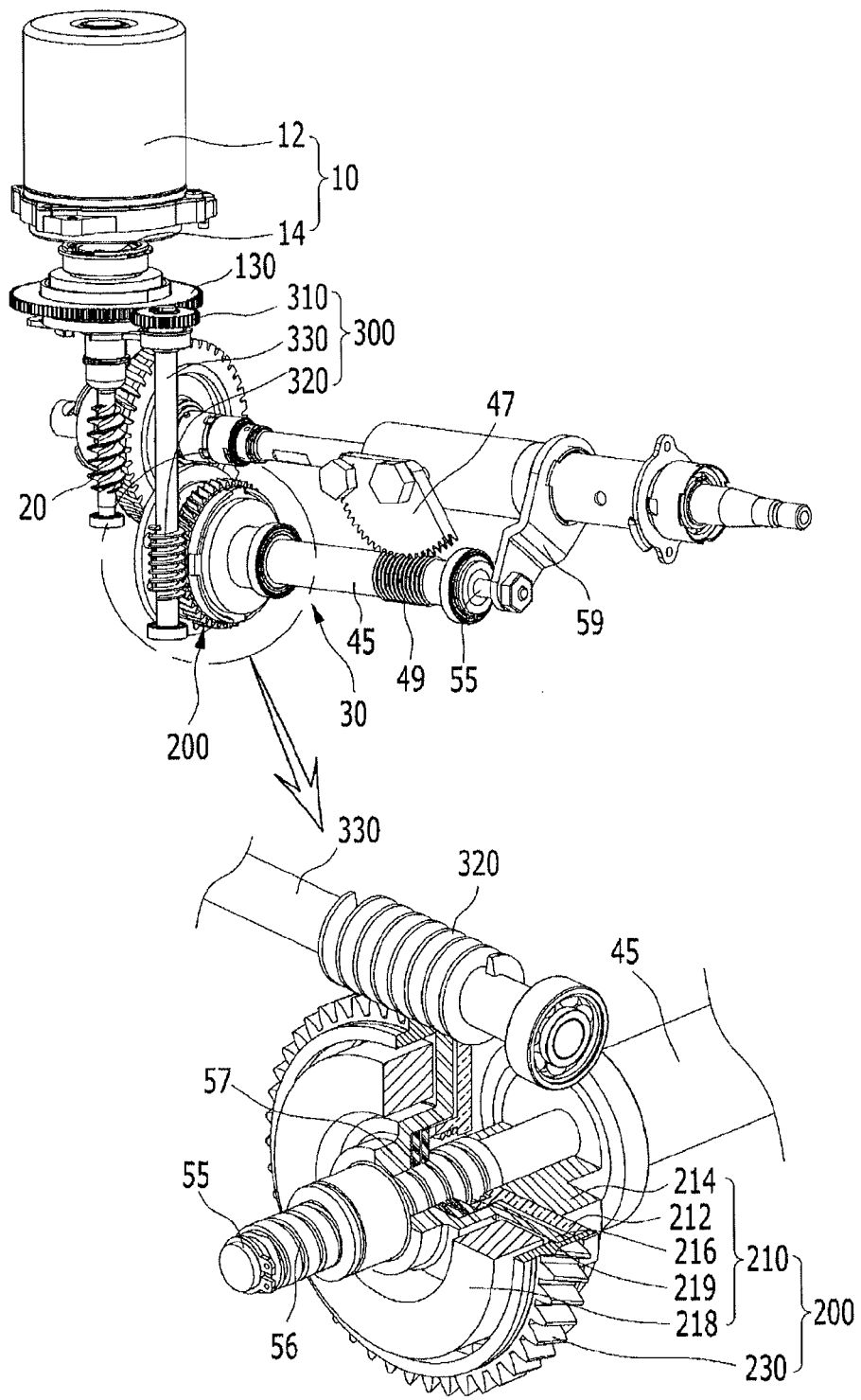
FIG. 6 is a schematic diagram of the second system and the second converting section in a steering apparatus of a vehicle according to an exemplary embodiment of the present invention.
Figure 7:
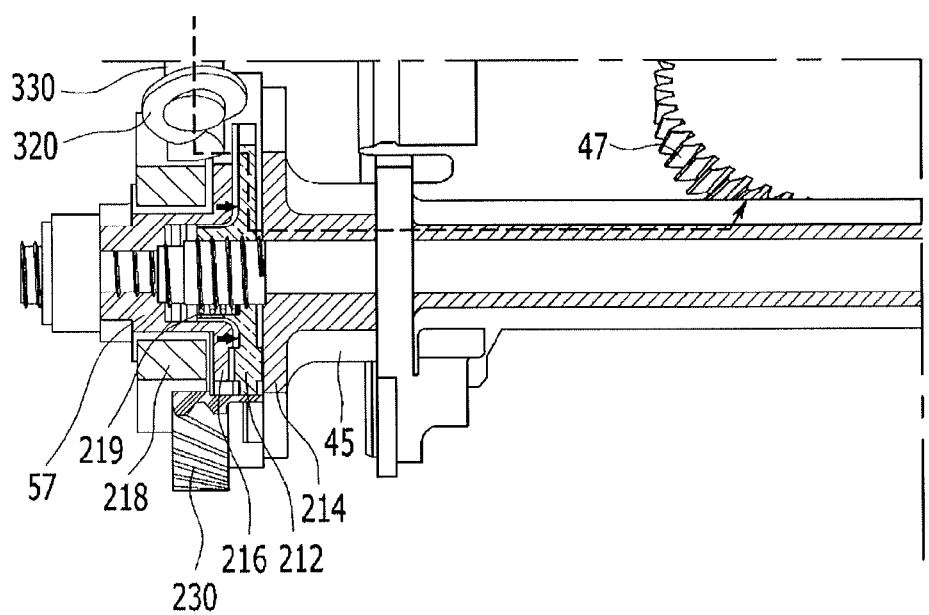
FIG. 7 to FIG. 8 are schematic diagrams for showing operation of the second converting section according to an exemplary embodiment of the present invention.
Figure 8:
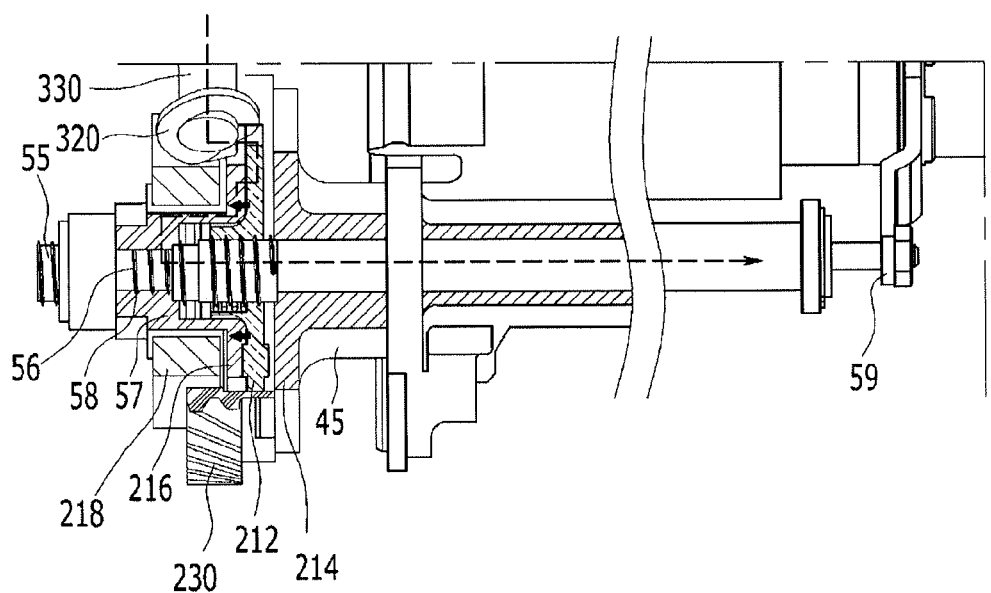

FIG. 6 is a schematic diagram of the second system and the second converting section in a steering apparatus of a vehicle according to an exemplary embodiment of the present invention, and FIG. 7 to FIG. 8 are schematic diagrams for showing operation of the second converting section according to an exemplary embodiment of the present invention. A dotted line in FIG. 7 to FIG. 8 indicates a delivery direction of the torque of the motor 12, and a bold arrow indicates an operating direction of a connecting clutch plate 212 of the variable steering clutch 210.

The second system of the steering apparatus 1 delivers the torque of the motor 12 delivered to the variable steering section 30 to the tilting device 40 or the telescopic device 50 by using the second converting section 200, and includes the motor driving section 10, the first delivery member 130, the connecting section 300, the second converting section 200, the tilting device 40, and the telescopic device 50.

Structures and operations of the motor driving section 10 and the connecting section 300 are the same as those described above, and thus detailed description thereof will be omitted.

The first delivery member 130 is connected to the motor shaft 14 and delivers the torque of the motor 12 from the motor shaft 14 to the connecting section 300. Various types of the first delivery member 130 may be used. For example, the first delivery member 130 of the first converting section 100 can be used, as shown in FIG. 6.

As described above, the second converting section 200 delivers the torque of the motor 12 to one of the tilting device 40 and the telescopic device 50 by using the variable steering clutch 210.

In further detail, the second converting section 200 is connected respectively to the tilting device 40, the telescopic device 50, and the connecting section 300, and delivers the torque of the motor 12 delivered from the connecting section 300 to one of the tilting device 40 and the telescopic device 50 according to operation of the variable steering clutch 210. The second converting section 200 is selectively coupled to one of the tilting device 40 and the telescopic device 50 in a state of being connected to the connecting section 300.

The second converting section 200 includes the second delivery member 230 connected to the second connecting member 320 of the connecting section 300 and the variable steering clutch 210 receiving the torque of the motor 12 from the second delivery member 230.

The variable steering clutch 210 includes the connecting clutch plate 212 coupled to the second delivery member 230, a first contact plate 214 coupled to the tilting rotational member 41, a second contact plate 216 coupled to the telescopic rotational member 51, a second electromagnet 218, and a second elastic member 219.

The connecting clutch plate 212 is movable between the first contact plate 214 and the second contact plate 216, and couples the connecting section 300 to or decouples the connecting section 300 from the tilting device 40 or the telescopic device 50.

In further detail, the second electromagnet 218 and the second elastic member 219 move the connecting clutch plate 212. The connecting clutch plate 212 is decoupled from the second contact plate 216 if the connecting clutch plate 212 is coupled to the first contact plate 214, and the connecting clutch plate 212 is coupled to the second contact plate 216 if the connecting clutch plate 212 is decoupled from the first contact plate 214.

Referring to FIG. 6 to FIG. 8, the tilting device 40, the telescopic device 50, the variable steering clutch 210, and the second delivery member 230 according to an exemplary embodiment of the present invention will be described in detail.

The tilting device 40 includes a pipe body 45 and an operating plate 47.

The pipe body 45 has one end coupled to the first contact plate 214 so as to be rotated by the connecting clutch plate 212. A first screw thread 49 is formed at an exterior circumference of the pipe body 45, and the operating plate 47 moves along the first screw thread 49 so as to change the angle of the steering column 5 when the pipe body 45 rotates. The operating plate 47 is connected to the pipe body 45 and the steering column 5 and has various shapes.

The telescopic device 50 includes a shaft body 55, a nut member 57, and a movable member 59.

A part of the shaft body 55 is inserted in the pipe body 45 of the tilting device 40, and a second screw thread 56 is formed at an exterior circumference of the other part of the shaft body 55 that is not inserted in the pipe body 45 so as to be threaded with a third screw thread 58 of the nut member 57.

The second contact plate 216 is coupled to an end of the nut member 57, and the nut member 57 is rotated when the connecting clutch plate 212 and the second contact plate 216 are coupled and rotated. Therefore, the shaft body 55 rotates along the third screw thread 58 of the nut member 57 and moves in a length direction thereof. The movable member 59 connecting the shaft body 55 with the steering column 5 moves the steering column 5 when the shaft body 55 moves.

The connecting clutch plate 212 of the variable steering clutch 210 is inserted in the shaft body 55 of the telescopic device 50 and is provided between the first contact plate 214 and the second contact plate 216. The second delivery member 230 is coupled to an exterior circumference of the connecting clutch plate 212 and is meshed with the second connecting member 320 of the connecting section 300.

The second electromagnet 218 of the variable steering clutch 210 is disposed close to the second contact plate 216, and the second elastic member 219 is inserted in the shaft body 55 of the telescopic device 50 and is coupled to the connecting clutch plate 212.

If current is not supplied to the second electromagnet 218, that is, the second electromagnet 218 is not magnetized by current, the connecting clutch plate 212 is coupled to the first contact plate 214 by the second elastic member 219.

If current is supplied to the second electromagnet 218, that is, the second electromagnet 218 is magnetized by current, the second electromagnet 218 pulls the connecting clutch plate 212 toward the second contact plate 216. Therefore, the connecting clutch plate 212 is decoupled from the first contact plate 214 and coupled to the second contact plate 216.

Teeth may be formed at respective contacting surfaces of the connecting clutch plate 212, the first contact plate 214, and the second contact plate 216. In further detail, teeth that can be engaged with each other are formed respectively at contacting surfaces of the first contact plate 214 and the connecting clutch plate 212, and teeth that can be engaged with each other are formed respectively at contacting surfaces of the second contact plate 216 and the connecting clutch plate 212. Thereby, coupling force and delivery of rotational force may be improved.

The second system of the steering apparatus 1 is adapted to deliver the torque of the motor 12 to the tilting device 40 or the telescopic device 50. Operation of the second system will be described in detail.

If current is not supplied to the second electromagnet 218, the connecting clutch plate 212 and the first contact plate 214 are coupled by elastic force of the second elastic member 219. Therefore, if the torque of the motor 12 is delivered to the second delivery member 230 through the first delivery member 130 and the connecting section 300, the connecting clutch plate 212 and the first contact plate 214 are rotated by rotation of the second delivery member 230. The pipe body 45 of the tilting device 40 is rotated by the first contact plate 214, and the angle of the steering column 5 is controlled by the operating plate 47 of the tilting device 40.

If current is supplied to the second electromagnet 218, the connecting clutch plate 212 and the second contact plate 216 are coupled. Therefore, if the torque of the motor 12 is delivered to the second delivery member 230 through the first delivery member 130 and the connecting section 300, the connecting clutch plate 212 and the second contact plate 216 are rotated by rotation of the second delivery member 230. The shaft body 55 of the telescopic device 50 is rotated by the second contact plate 216 and the nut member 57, and the length of the steering column 5 is controlled by the movable member 59 of the telescopic device 50.

Figure 9A:
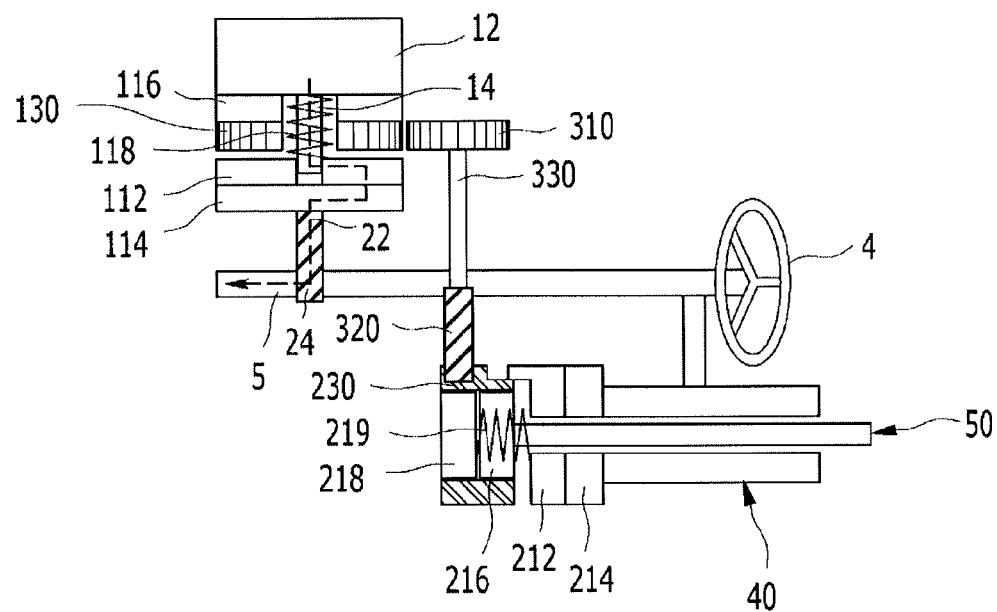
FIG. 9A to FIG. 9C are diagrams for briefly showing a steering apparatus of a vehicle including the first converting section and the second converting section according to an exemplary embodiment of the present invention.
Figure 9B:
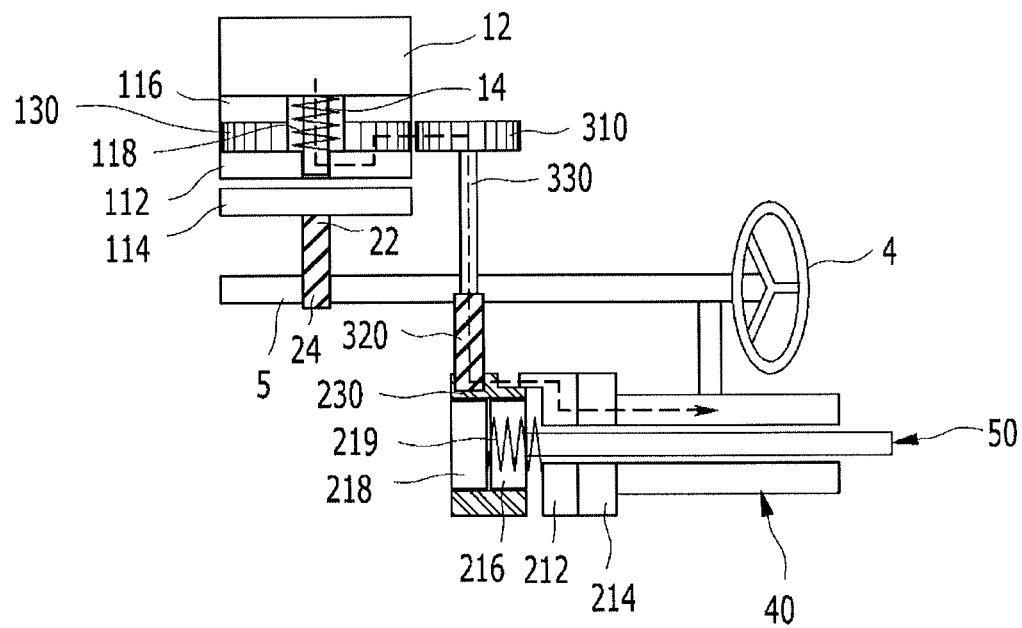
Figure 9C:
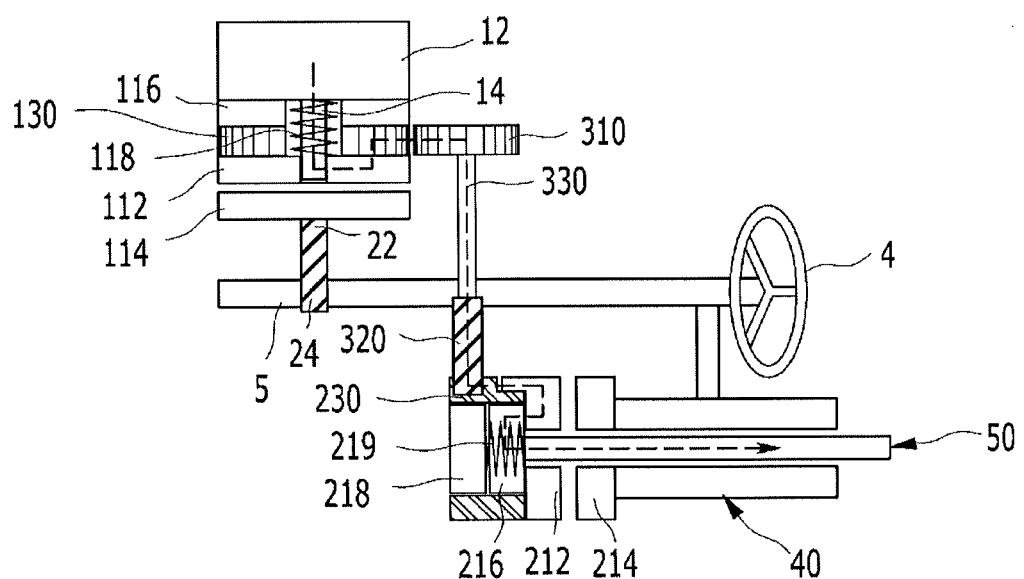

FIG. 9A to FIG. 9C are diagrams for briefly showing a steering apparatus of a vehicle including the first converting section and the second converting section according to an exemplary embodiment of the present invention. A dotted line in FIG. 9A to FIG. 9C indicates delivery direction of the torque of the motor 12.

Referring to FIG. 9A to FIG. 9C, the steering apparatus 1 is adapted to supply current to the first electromagnet 116 of the first converting section 100 and/or the second electromagnet 218 of the second converting section 200 such that the torque of the motor 12 is delivered to one of the power delivery section 20, the tilting device 40, and the telescopic device 50.

In a case that the maneuvering force of the steering handle 4 is assisted, current is not supplied to both of the first electromagnet 116 of the first converting section 100 and the second electromagnet 218 of the second converting section 200, as shown in FIG. 9A. Therefore, the first clutch plate 112 is coupled to the second clutch plate 114 by the first elastic member 118 such that the torque of the motor 12 is delivered to the steering column 5 through the power delivery shaft 22. At this time, the connecting clutch plate 212 is coupled to the first contact plate 214 by the second elastic member 219.

In a case that the angle of the steering handle 4 is controlled, current is supplied to the first electromagnet 116 of the first converting section 100 and is not supplied to the second electromagnet 218 of the second converting section 200, as shown in FIG. 9B. Therefore, the first clutch plate 112 is coupled to the first delivery member 130 such that the torque of the motor 12 is delivered to the connecting section 300. The connecting clutch plate 212 coupled to the first contact plate 214 delivers the torque of the motor 12 received from the connecting section 300 to the tilting device 40. Therefore, the angle of the steering column 5 is controlled.

In a case that the length of the steering handle 4 is controlled, current is supplied to the first electromagnet 116 of the first converting section 100 and the second electromagnet 218 of the second converting section 200, as shown in FIG. 9C. Therefore, the first clutch plate 112 is coupled to the first delivery member 130 such that the torque of the motor 12 is delivered to the connecting section 300. The connecting clutch plate 212 coupled to the second contact plate 214 delivers the torque of the motor 12 received from the connecting section 300 to the telescopic device 60. Therefore, the length of the steering column 5 is controlled.

Figure 10:
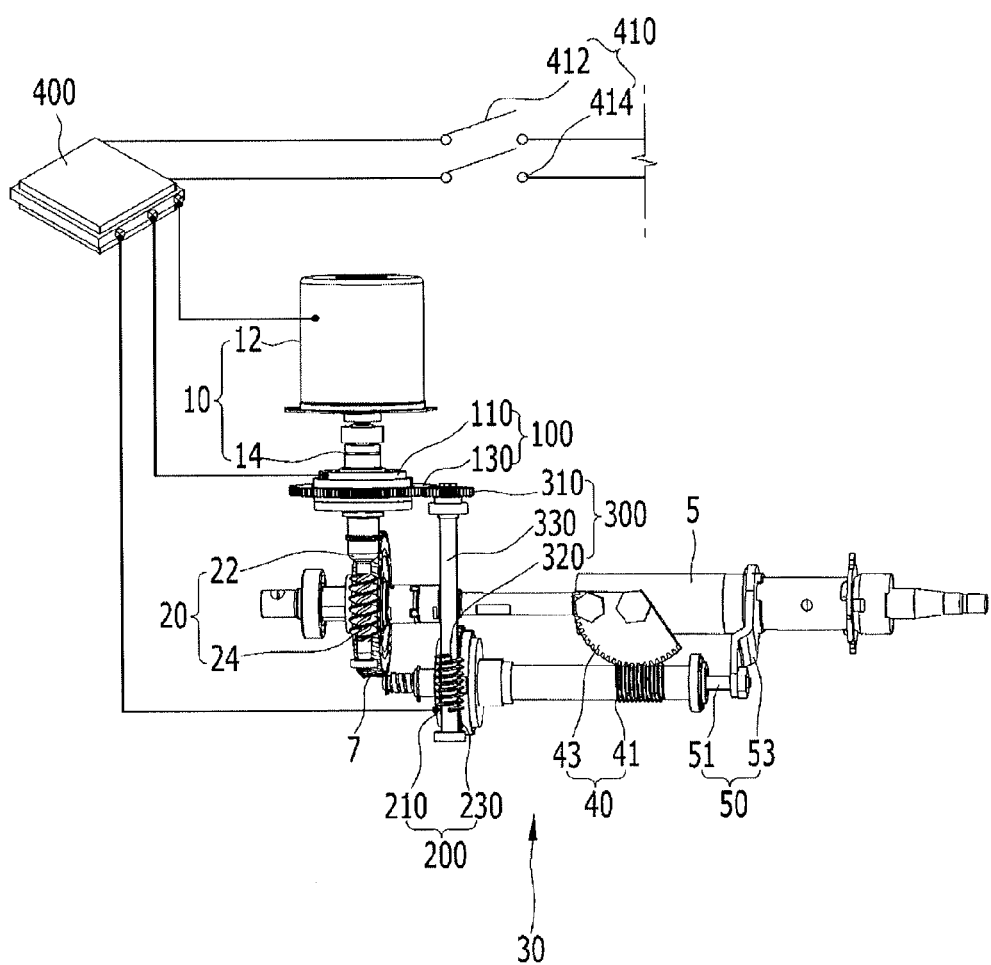
FIG. 10 is a schematic diagram of a system of controlling a steering apparatus of a vehicle according to an exemplary embodiment of the present invention.

FIG. 10 is a schematic diagram of a system of controlling a steering apparatus of a vehicle according to an exemplary embodiment of the present invention.

Referring to FIG. 10, a system 2 of controlling the steering apparatus of the vehicle is adapted to control the steering apparatus 1 by using one control portion 400.

The control portion 400 controls the motor 12, the motor clutch 110 of the first converting section 100, and the variable steering clutch 210 of the second converting section 200. In further detail, the control portion 400 transmits a driving signal to the motor 12, an operating signal to the motor clutch 110, and an operating signal to the variable steering clutch 210.

If maneuver of the steering handle 4 is detected, that is, the steering handle 4 is maneuvered while driving or a switch (i.e., variable steering switch 410) for controlling the angle or the length of the steering handle 4 is switched on, the control portion 400 transmits the driving signal to the motor 12.

In addition, the control portion 400 transmits the operating signal to the motor clutch 110 so as to control coupling or decoupling of the motor shaft 14 and the power delivery shaft 22. If the maneuvering force of the steering handle 4 should be assisted, the control portion 400 delivers the operating signal so as to couple the motor shaft 14 to the power delivery shaft 22. If the angle or the length of the steering handle 4 should be controlled, the control portion 400 transmits the operating signal so as to decouple the motor shaft 14 from the power delivery shaft 22.

In addition, the control portion 400 transmits the operating signal to the variable steering clutch 210 such that the variable steering clutch 210 is coupled with one of the tilting device 40 and the telescopic device 50. If the steering apparatus 1 controls the angle of the steering handle 4, the control portion 400 transmits the operating signal to the tilting device 40 so as to be coupled with the variable steering clutch 210. If the steering apparatus 1 controls the length of the steering handle 4, the control portion 400 transmits the operating signal to the telescopic device 50 so as to be coupled with the variable steering clutch 210.

Operation of the system 2 of controlling the steering apparatus according to an exemplary embodiment of the present invention will be described in detail in relation to the first converting section and the second converting section shown in FIG. 3 and FIG. 6.

If maneuver of the steering handle 4 is detected, the control portion 400 transmits the driving signal to the motor 12, transmits the operating signal for supplying current to the first electromagnet 116 of the motor clutch 110 if the variable steering switch 410 is switched on, and transmits the operating signal for supplying current to the second electromagnet 218 of the variable steering clutch 210 if a switch 414 of the telescopic device 50 is switched on.

The operation of the system including the control portion 400 will be described in further detail.

If maneuver of the steering handle 4 is detected, the control portion 400 transmits the driving signal to the motor 12 so as to drive the motor 12. Particularly, if the steering handle 4 is maneuvered while driving, the control portion 400 transmits the driving signal to the motor 12. Therefore, the torque of the motor 12 is delivered to the steering column 4 through the power delivery shaft 22 coupled with the motor shaft 14.

If the variable steering switch 410 is switched on, the control portion 400 transmits the driving signal to the motor 12 and the operating signal for supplying current to the first electromagnet 116 to the motor clutch 110. Therefore, the first electromagnet 116 of the motor clutch 110 is magnetized by current, the power delivery shaft 22 is decoupled from the motor shaft 14 by magnetic force of the first electromagnet 116, and the torque of the motor 12 is delivered to the variable steering section 30 through the connecting section 300 connected to the motor shaft 14.

If the switch 412 of the tilting device 40 is switched on, the torque of the motor 12 is delivered to the steering column 5 through the tilting device 40 coupled to the connecting clutch plate 212 of the variable steering clutch 210.

If the switch 414 of the telescopic device 50 is switched on, the control portion 400 transmits the driving signal to the motor 12, the operating signal for supplying current to the first electromagnet 116 to the motor clutch 110, and the operating signal for supplying current to the second electromagnet 218 to the variable steering clutch 210. Therefore, the second electromagnet 218 of the variable steering clutch 210 is magnetized, and the connecting clutch plate 212 is coupled to the telescopic device 50 by magnetic force of the second electromagnet 218. In this case, the torque of the motor 12 is delivered to the connecting clutch plate 212 of the variable steering section 30 through the connecting section 300 connected to the motor shaft 14 so as to be delivered to the steering column 5 through the telescopic device 50.

Figure 11:
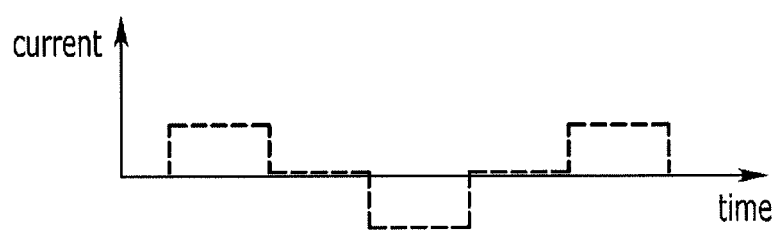
FIG. 11 is a graph for showing current supplied to an electromagnet clutch over time in an exemplary embodiment of the present invention.
Figure 12:
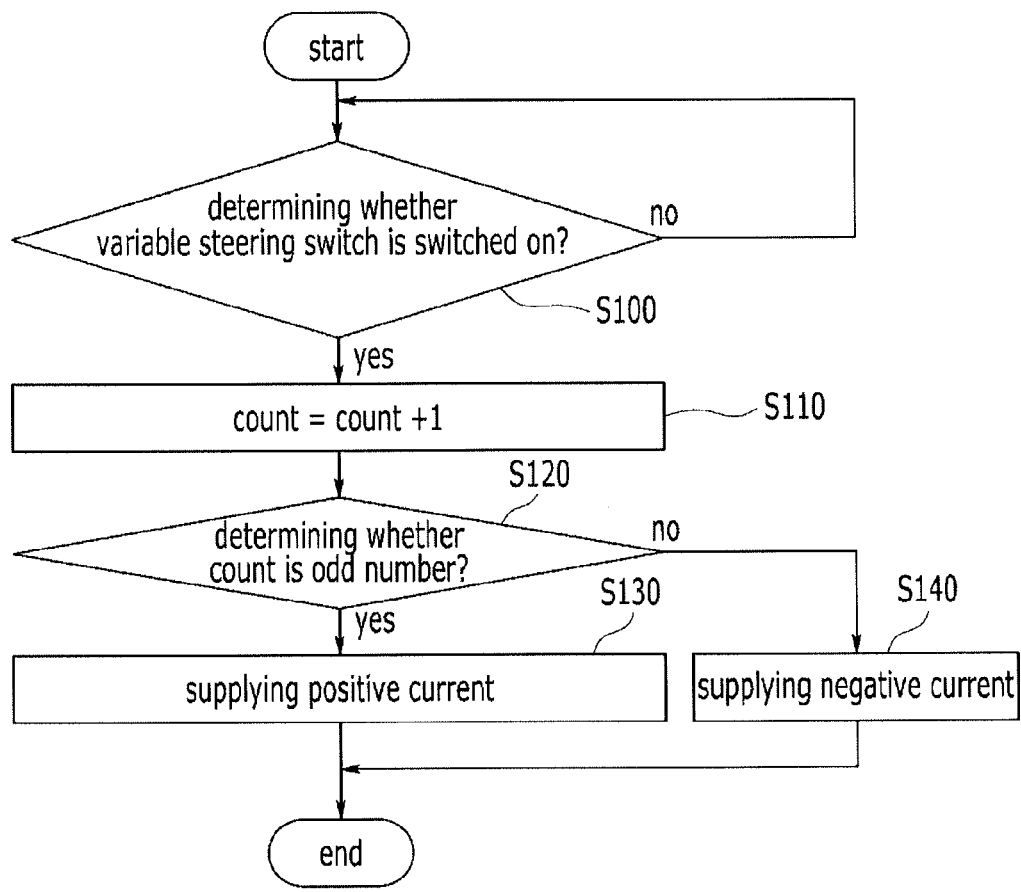
FIG. 12 and FIG. 13 are flowcharts of a method of supplying current to an electromagnet clutch.
Figure 13:
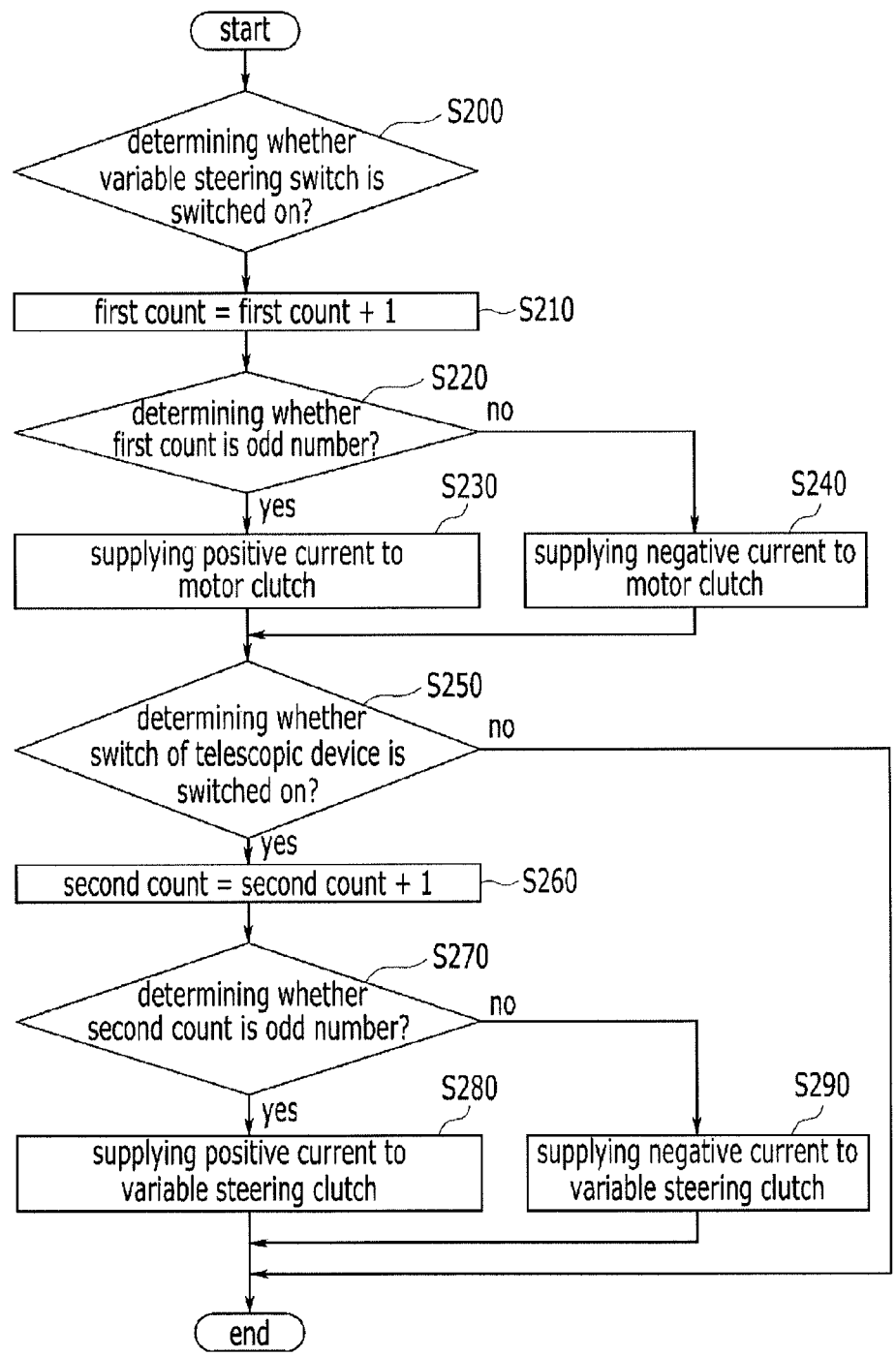

FIG. 11 is a graph for showing current supplied to an electromagnet clutch over time in an exemplary embodiment of the present invention, and FIG. 12 and FIG. 13 are flowcharts of a method of supplying current to an electromagnet clutch.

Referring to FIG. 11, the control portion 400 is adapted to supply current, direction of which is changed sequentially, to the first electromagnet 116 of the motor clutch 110 and the second electromagnet 218 of the variable steering clutch 210. That is, the control portion 400 controls supply of current to each electromagnet such that direction of the previously supplied current is different from that of the currently supplied current.

In further detail, if the variable steering switch 410, that is, the switch 412 of the tilting device 40 or the switch 414 of the telescopic device 50 is switched on for the first time, the control portion 400 may transmit the operating signal so as to supply positive current to the first and second electromagnets 116 and 218. After that, if the switch 412 of the tilting device 40 or the switch 414 of the telescopic device 50 is switched on again, the control portion 400 may transmit the operating signal so as to supply negative current to the first and second electromagnets 116 and 218.

If the switch 412 of the tilting device 40 is switched on, the torque of the motor 12 is delivered to the tilting device 40 of the variable steering section 30 so as to control the angle of the steering column 5. That is, if the current is supplied to the first electromagnet 116 of the motor clutch 110, the first clutch plate 112 of the motor clutch 110 is decoupled from the second clutch plate 114 by magnetic force of the first electromagnet 116 and coupled to the first delivery member 130. At this time, the control portion 400 supplies the current, direction of which is different from that of the previously supplied current, to the first electromagnet 116.

If the switch 414 of the telescopic device 50 is switched on, the torque of the motor 12 is delivered to the telescopic device 50 of the variable steering section 30 so as to control the length of the steering column 5. That is, if the current is supplied to the first electromagnet 116 of the motor clutch 110 and the second electromagnet 218 of the variable steering clutch 210, the first clutch plate 112 of the motor clutch 110 is decoupled from the second clutch plate 114 by magnetic force of the first electromagnet 116 and is coupled to the first delivery member 130, and the connecting clutch plate 212 of the variable steering clutch 210 is decoupled from the first contact plate 214 and is coupled to the second contact plate 216 by magnetic force of the second electromagnet 218. At this time, the control portion 400 supplies the current, direction of which is different from that of the previously supplied current, to the each of the electromagnets 116 and 218.

A method for supplying current to each of the electromagnets 116 and 218 according to an exemplary embodiment of the present invention will be described in detail.

Referring to FIG. 12, the control portion 400 determines whether the variable steering switch 410 is switched on at step S100. If the variable steering switch 410 is switched on, the control portion 400 calculates a count at step S110. Calculation of the count is performed whenever the variable steering switch 410 is switched on. For example, if the variable steering switch 410 is switched on for the first time, the count is 1. If the variable steering switch 410 is switched on sequentially, the count is 2. It is determined whether the count is odd number at step S120, each direction of the current supplied to the electromagnets 116 and 218 is changed according to whether the count is odd number or even number. If the count, for example, is odd number positive current is supplied to each of the electromagnets 116 and 218 at step S130, and if the count is even number negative current is supplied to each of the electromagnets 116 and 218 at step S140. However, supply of current is not limited to this.

In further detail, calculation of the count is performed respectively at a case where the switch 412 of the tilting device 40 is switched on and a case where the switch 414 of the telescopic device 50 is switched on.

The current is supplied to the first electromagnet 116 of the motor clutch 110 if the switch 412 of the tilting device 40 is switched on, but the current is supplied to the first and second electromagnets 116 and 218 of the motor clutch 110 and the variable steering clutch 210 if the switch 414 of the telescopic device 50 is switched on. Therefore, calculation of the count for the first electromagnet 116 of the motor clutch 110 and calculation of the count for the second electromagnet 218 of the variable steering clutch 210 are separately performed.

In one or more exemplary embodiments, it is determined whether the variable steering switch 410 is switched on regardless of whether the tilting device 40 or the telescopic device 50 is operated at step S200, referring to FIG. 13. If the variable steering switch 410 is switched on, 1 is added to a first count stored in advance at step S210 and the first count is stored again. After that, it is determined whether the switch 414 of the telescopic device 50 is switched on at step S250. If the switch 414 of the telescopic device 50 is switched on, 1 is added to a second count stored in advance at step S260 and the second count is stored again.

It is determined whether each of the first count and the second count is odd number respectively at steps S220 and S270. The positive current is supplied to the first electromagnet 116 of the motor clutch 110 at step S230 if the first count is odd number, and the negative current is supplied to the first electromagnet 116 of the motor clutch 110 at step S240 if the first count is even number. In addition, the positive current is supplied to the second electromagnet 218 of the variable steering clutch 210 at step S280 if the second count is odd number, and the negative current is supplied to the electromagnet 218 of the variable steering clutch 210 at step S290 if the second count is even number.

Each of the switches 410, 412, and 414 for operating the steering apparatus of the vehicle may be a manual switch that is switched on/off by a driver or an automatic switch that is switched on/off by a sensor.

According to an exemplary embodiment of the present invention, the maneuvering force of the steering column may be assisted or the angle and the length of the steering column may be controlled by one motor.

According to an exemplary embodiment of the present invention, the torque of the motor for assisting the maneuvering force of the steering column may be effectively delivered to the variable steering device for controlling the angle of the steering column.

According to an exemplary embodiment of the present invention, layout of the vehicle body may be effectively changed, weight of the vehicle body may be reduced, and production cost of the vehicle may be lowered.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering apparatus of a vehicle, comprising:
a motor;
a motor shaft connected to the motor and delivering a torque of the motor;
a power delivery section selectively engaged to the motor shaft and delivering the torque of the motor received from the motor shaft to a steering column;
a variable steering section connected to the steering column and selectively engaged to the motor shaft to control an angle and a length of the steering column;
a connecting section selectively engaged to the motor shaft and delivering the torque of the motor to the variable steering section; and
a first converting section delivering the torque of the motor to one of the power delivery section and the connecting section selectively,
wherein the first converting section includes
a motor clutch coupling a power delivery shaft of the power delivery section to or decoupling the power delivery shaft from the motor shaft, and
a delivery member engaged to the motor shaft and delivering the torque of the motor to the connecting section when the motor shaft is decoupled from the power delivery shaft by the motor clutch.

2. The steering apparatus of claim 1, wherein the motor clutch is an electromagnet clutch.

3. The steering apparatus of claim 2, wherein the motor clutch includes:
a first clutch plate connected to the motor shaft;
a second clutch plate connected to the power delivery shaft;
an electromagnet disposed adjacent to the first clutch plate and being selectively magnetized by current; and
an elastic member elastically biasing the first clutch plate or the second clutch plate,
wherein the first clutch plate is coupled to or decoupled from the second clutch plate according to whether current is supplied to the electromagnet.

4. The steering apparatus of claim 3,
wherein the delivery member is disposed between the first clutch plate and the electromagnet and disposed apart from the motor shaft, and
wherein the first clutch plate is coupled to or decoupled from the delivery member according to whether current is supplied to the electromagnet.

5. The steering apparatus of claim 4, wherein teeth are formed respectively at contacting surfaces of the first clutch plate and the second clutch plate.

6. The steering apparatus of claim 4, wherein teeth are formed respectively at contacting surfaces of the first clutch plate and the delivery member.

7. The steering apparatus of claim 4, wherein the connecting section includes:
a first connecting member engaged with the delivery member;
a second connecting member engaged with the variable steering section; and
a connecting shaft connecting the first connecting member with the second connecting member.

8. The steering apparatus of claim 7,
wherein the motor shaft and the connecting shaft are disposed apart from and in parallel with each other, and
wherein the first connecting member and the delivery member are spur gears, respectively.

9. The steering apparatus of claim 7,
wherein the power delivery shaft is positioned perpendicularly to the steering column, and
wherein a worm is formed at one of the power delivery shaft and the steering column, and a worm wheel is formed at the other of the power delivery shaft and the steering column.

10. A system of controlling a steering apparatus of a vehicle, comprising:
a motor;
a motor shaft connected to the motor to deliver torque of the motor;
a power delivery section selectively coupled to the motor shaft to deliver the torque of the motor received from the motor shaft to a steering column for assisting maneuvering force of a steering handle;

a connecting section selectively coupled to the motor shaft to deliver the torque of the motor to a variable steering section so as to control an angle and a length of the steering column;

a motor clutch coupling a power delivery shaft of the power delivery section to or disconnecting the power delivery shaft from the motor shaft;

a delivery member engaged with the motor shaft and delivering the torque of the motor to the connecting section when the motor shaft is decoupled from the power delivery shaft by the motor clutch; and a control portion controlling operations of the motor and the motor clutch.

11. The system of claim 10, wherein the control portion transmits a control signal to the motor so as to drive the motor when maneuver of the steering handle is detected, transmitting a control signal to the motor clutch for coupling the motor shaft with the power delivery shaft when assistance to the maneuvering force of the steering handle is requested, and transmitting a control signal to the motor clutch for decoupling the motor shaft from the power delivery shaft when control of the angle or the length of the steering handle is requested.

12. The system of claim 10,
wherein the motor clutch is a clutch using an electromagnet, and
wherein the control portion controls supply of current to the electromagnet so as to control the operation of the motor clutch.

13. The system of claim 12, wherein the motor clutch includes:
a first clutch plate connected to the motor shaft;
a second clutch plate connected to the power delivery shaft;
the electromagnet disposed adjacent to the first clutch plate and being selectively magnetized by current; and
an elastic member elastically biasing the first clutch plate or the second clutch plate, and
wherein when current is not supplied to the electromagnet by the control signal of the control portion, the first clutch plate and the second clutch plate are coupled by an elastic force of the elastic member, and
when current is supplied to the electromagnet by the control signal of the control portion, the first clutch plate is decoupled from the second clutch plate and is coupled to the delivery member by magnetic force of the electromagnet.

* * * * *